(12) United States Patent
Karmi (10) Patent No.: US 7,835,702 B1
(45) Date of Patent: Nov. 16, 2010

(54) CALCULATING A DIVERSITY PARAMETER ADJUSTMENT ACCORDING TO PREVIOUSLY APPLIED DIVERSITY PARAMETER ADJUSTMENTS

(75) Inventor: Yair Karmi, Bridgewater, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 943 days.

(21) Appl. No.: 11/228,428

(22) Filed: Sep. 15, 2005

(51) Int. Cl.
  *H04B 1/00* (2006.01)
  *H04B 15/00* (2006.01)
  *H04B 17/00* (2006.01)
  *H04B 7/00* (2006.01)
  *H04K 1/10* (2006.01)
  *H04L 27/28* (2006.01)

(52) U.S. Cl. .................. 455/67.11; 455/63.1; 455/522; 375/142; 375/260

(58) Field of Classification Search .................. 455/423, 455/522, 63.1, 67.11, 67.13, 553.1, 562.1; 375/260, 142
See application file for complete search history.

(56) References Cited

U.S. PATENT DOCUMENTS

| | | | |
|---|---|---|---|
| 5,642,353 A | 6/1997 | Roy, III et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,434,366 B1 * | 8/2002 | Harrison et al. | 455/69 |
| 6,492,942 B1 | 12/2002 | Kezys | |
| 6,636,495 B1 * | 10/2003 | Tangemann | 370/334 |
| 6,704,370 B1 | 3/2004 | Chheda et al. | |

(Continued)

FOREIGN PATENT DOCUMENTS

EP        1 282 242        2/2003

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner*—Andrew Wendell
(74) *Attorney, Agent, or Firm*—Pearl Cohen Zedek Latzer, LLP (57) ABSTRACT

Calculating a diversity parameter adjustment includes accessing diversity parameter data generated from diversity parameter adjustments applied to a signal transmitted from a modifying communication device to a feedback communication device. The following are repeated. The signal is modified according to a current diversity parameter adjustment. Feedback describing the signal modified according to the current diversity parameter adjustment is received. The feedback describes the modified signal as received by the feedback communication device. A candidate diversity parameter adjustment is established in accordance with feedback. A most probable diversity parameter value is determined from the diversity parameter data, whether the candidate diversity parameter adjustment moves towards most probable diversity parameter value is determined. A next diversity parameter adjustment is established in accordance with the determination.

19 Claims, 4 Drawing Sheets

U.S. PATENT DOCUMENTS

| | | | |
|---|---|---|---|
| 6,745,009 B2 * | 6/2004 | Raghothaman | 455/63.1 |
| 6,810,264 B1 | 10/2004 | Park et al. | |
| 6,859,643 B1 | 2/2005 | Ma et al. | |
| 6,865,377 B1 * | 3/2005 | Lindskog et al. | 455/101 |
| 6,882,228 B2 | 4/2005 | Rofougaran | |
| 6,892,059 B1 * | 5/2005 | Kim et al. | 455/272 |
| 7,010,318 B2 * | 3/2006 | Chang et al. | 455/522 |
| 7,054,639 B2 * | 5/2006 | Lin et al. | 455/452.1 |
| 7,116,944 B2 * | 10/2006 | Das et al. | 455/69 |
| 7,340,282 B2 * | 3/2008 | Park et al. | 455/562.1 |
| 2002/0128026 A1 * | 9/2002 | Derryberry et al. | 455/504 |
| 2003/0002594 A1 | 1/2003 | Harel et al. | |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2004/0203397 A1 * | 10/2004 | Yoon et al. | 455/63.1 |
| 2005/0059355 A1 * | 3/2005 | Liu | 455/67.14 |
| 2005/0143113 A1 | 6/2005 | Lee et al. | |
| 2005/0181736 A1 * | 8/2005 | Cao et al. | 455/69 |
| 2006/0267983 A1 * | 11/2006 | Karmi et al. | 345/440 |
| 2006/0270359 A1 * | 11/2006 | Karmi et al. | 455/69 |
| 2007/0009016 A1 * | 1/2007 | Tsutsui | 375/219 |

FOREIGN PATENT DOCUMENTS

| | | |
|---|---|---|
| EP | 1 282 244 | 2/2003 |
| EP | 1 284 545 | 2/2003 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 02/099999 | 12/2002 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

"*Physical Layer Standard for cdma2000 Spread Spectrum Systems*", Release C, 3G, 3$^{rd}$ Generation Partnership Project 2 "3GPP2", 3GPP2 C.S0002-C, Version 1.0, pp. 2-42 thru 2-68 plus cover, May 28, 2002.

Pending U.S. Appl. No. 10/963,046 entitled, "*Determining A Power Control Group Boundary Of A Power Control Group*", 40 pages specification, claims and abstract, 8 pages of drawings, inventors Qing (nmi) Li, et al, Oct. 12, 2004.

Pending U.S. Appl. No. 11/136,020 entitled, "*Determining A Phase Adjustment In Accordance With Power Trends*", 45 pages specification, claims and abstract, 3 pages of drawings, inventors Yair (nmi) Karmi, et al., May 24, 2005.

Pending U.S. Appl. No. 11/136,017 entitled, "*Modifying A Signal By Adjusting The Phase And Amplitude Of The Signal*", 38 pages specification, claims and abstract, 3 pages of drawings, inventors Yair (nmi) Karmi, et al., May 24, 2005.

Pending U.S. Appl. No. 11/159,646 entitled, "*Modifying A Signal In Response To Quality Indicator Availability*", 37 pages specification, claims and abstract, 7 pages of drawings, inventors Haim (nmi) Harel, et al., Jun. 23, 2005.

International Search Report for International Application No. PCT/US2006/018734 mailed Sep. 27, 2006.

International Search Report for International Application No. PCT/US2006/019228 mailed Sep. 27, 2006.

\* cited by examiner

CALCULATING A DIVERSITY PARAMETER ADJUSTMENT ACCORDING TO PREVIOUSLY APPLIED DIVERSITY PARAMETER ADJUSTMENTS

TECHNICAL FIELD

This invention relates generally to the field of wireless communications and more specifically to calculating a diversity parameter adjustment according to previously applied diversity parameter adjustments.

BACKGROUND

A transmitting communication device may have multiple antenna elements that transmit signals to communicate information. A receiving communication device extracts the information from the transmitted signals. Multiple antenna elements may enhance spectral efficiency, allowing for more users to be simultaneously served over a given frequency band. The transmitted signals, however, propagate along different paths and may reach the receiving communication device with different phases that destructively interfere. It is generally desirable to reduce interference of transmitted signals.

SUMMARY OF THE DISCLOSURE

In accordance with the present invention, disadvantages and problems associated with previous techniques for determining diversity parameter adjustments may be reduced or eliminated.

According to one embodiment of the present invention, calculating a diversity parameter adjustment includes accessing diversity parameter data generated from diversity parameter adjustments applied to a signal transmitted from a modifying communication device to a feedback communication device. The following are repeated. The signal is modified according to a current diversity parameter adjustment. Feedback describing the signal modified according to the current diversity parameter adjustment is received. The feedback describes the modified signal as received by the feedback communication device. A candidate diversity parameter adjustment is established in accordance with feedback. A most probable diversity parameter value is determined from the diversity parameter data, whether the candidate diversity parameter adjustment moves towards most probable diversity parameter value is determined. A next diversity parameter adjustment is established in accordance with the determination.

Certain embodiments of the invention may provide one or more technical advantages. A technical advantage of one embodiment may be that a next phase adjustment to apply to a signal is determined according to phase data describing phases from adjustments previously applied to the signal. Determining the next phase adjustment according to the phase data may increase the probability of selecting a more optimal phase adjustment. A technical advantage of another embodiment may be that a most probable phase is calculated from the phase data. Phase adjustments that tend towards the most probable phase may be selected as the next adjustment. Selecting phase adjustments that tend towards the most probable phase may increase the probability of selecting more optimal phase adjustments.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
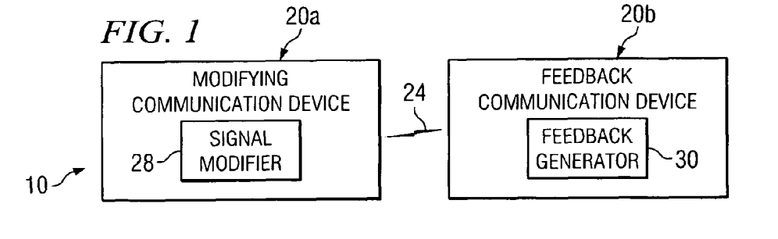
FIG. 1 is a block diagram illustrating one embodiment of a communication network that includes a modifying communication device that determines diversity parameter adjustments in accordance with diversity parameter data.

FIG. 1 is a block diagram illustrating one embodiment of a communication network 10 that includes a modifying communication device 20a that determines diversity parameter adjustments in accordance with diversity parameter data. According to the embodiment, modifying communication device 20a applies a diversity parameter adjustment to a signal transmitted to feedback communication device 20b. Feedback communication device 20b returns feedback that describes the power of the signal as received by feedback communication device 20b. Modifying communication device 20a determines a next diversity parameter adjustment in accordance with the feedback and diversity parameter data describing previously applied diversity parameter adjustments.

According to the embodiment, a diversity parameter represents a modulation feature. A modulation feature refers to a feature of a signal that may be modulated, for example, a phase, amplitude, frequency, timing, other suitable modulation feature, or any combination of the preceding. As an example, diversity parameters $\Phi$ and A may represent phase and amplitude, respectively. According to one embodiment, adjusting a modulation feature may be described as applying a diversity parameter representing the modulation feature.

According to the illustrated embodiment, network 10 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding. The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Example communication protocols and technologies include those set by the Institute of Electrical and Electronics Engineers, Inc. (IEEE) 802.xx standards such as 802.11 and 802.16 standards, International Telecommunications Union (ITU-T) standards, European Telecommunications Standards Institute (ETSI) standards, Internet Engineering Task Force (IETF) standards, or other standards.

Network 10 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Communication network 10 includes one or more modifying communication devices 20a and one or more feedback communication devices 20b that communicate via a wireless link 24. A communication device 20 represents any device operable to communicate information via signals to one or more other communication devices 20. For example, communication device 20 may comprise a subscriber unit or a base station. A subscriber unit may comprise any device operable to communicate with a base station, for example, a personal digital assistant, a cellular telephone, a mobile handset, or any other device suitable for communicating data to and from a base station. A subscriber unit may support, for example, Session Initiation Protocol (IP), Internet Protocol (IP), or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units, and may have one or more antennas. The base station controller manages the operation of the base transceiver station.

A communication device 20 may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 20a and 20b such as wireless link 24 may be a radio frequency link that is cellular in network organization. Wireless link 24 may be used to communicate a signal between communication devices 20a and 20b. Wireless link 24 may be configured according to a Multiple-Input-Multiple-Output (MIMO) communication protocol.

Modifying communication device 20a includes a signal modifier 28 that modifies one or more signals in accordance with feedback received from feedback communication device 20b. A signal may be modified by applying a phase adjustment to the signal to increase constructive interference or reduce destructive interference. According to one embodiment, a next phase adjustment Φ(k+1) may be calculated from a current phase adjustment Φ(k) and a phase increment ΔΦ(k) according to Equation (1a):

$$\Phi(k+1)=\Phi(k)+\Delta\Phi(k) \qquad (1a)$$

For a general diversity parameter f(k), a next diversity parameter adjustment f(k+1) may be calculated from a current diversity parameter f(k) and a diversity parameter increment Δf(k) according to Equation (1b):

$$f(k+1)=f(k)+\Delta f(k) \qquad (1b)$$

Adjusting the phase may yield two-level diversity equal gain combining, whereas adjusting a general set of diversity parameters may yield maximum ratio combining.

Signal modifier 28 may use the feedback information to determine a phase adjustment for a next window. The feedback may indicate, for example, whether modifying communication device 20a should increase or reduce transmission power. Feedback information may be obtained in any suitable manner. According to a perturbation technique, signal modifier 28 obtains feedback information from a quality indication signal from feedback communication device 20b. A quality indication signal may refer to a signal that describes a quality of a signal transmitted by modifying communication device 20a as received by feedback communication device 20b.

According to a window technique, signal modifier 28 obtains feedback information from a control signal generated by a baseband subsystem of modifying communication device 20a. A control signal may refer to a signal that provides instructions to a component of a communication device. According to the embodiment, the baseband subsystem extracts feedback from a quality indication signal from feedback communication device 20b, and generates a control signal that reflects the feedback. For example, the control signal may provide instructions on whether to increase or reduce transmission power.

According to one embodiment, a time period of a signal is divided into windows k. A window may refer to a time unit, where the portion has a predetermined length. A window may be divided into one or more slots $S_1, \ldots, S_N$ having the same or different durations. The slots may include participating slots $S_p, \ldots, S_q$, where $S_p$ refers to an initial participating slot and $S_q$ refers to a final participating slot. A participating slot may refer to a slot that carries a power indicator. A power indicator may refer to an indicator that reflects the power of the transmitted signal as received by feedback communication device 20b. A slot power value may be estimated from a power indicator. A window may have a window power value representing the power of a window. The power of a window may refer to the average of the slot power values of the participating slots of the window. A window may have a power trend. A power trend may refer to the slope of the power inside the window. According to one embodiment, slope may be measured as the difference in power values of the last participating slot $S_q$ and the first participating slot $S_p$.

According to one embodiment of the invention, the feedback information may be collected as phase data, from which a most probable phase may be calculated. The most probable phase may be used to determine a next phase adjustment of the signal. Phase data may refer to information describing phases from previously applied adjustments. According to one embodiment, the phase data may be expressed as a phase histogram of phases resulting from applied phase adjustments. The phase histogram may indicate the frequency distribution of the phases over a phase variable.

A phase variable may have any suitable unit, for example, units of circular degrees from zero to 360 degrees, where zero degrees is equivalent to 360 degrees. A phase variable of a phase histogram may be expressed as phase ranges. According to one embodiment, the phase variable may be divided into phase units. A phase unit may have any suitable width to optimize implementation. As an example, 360 degrees may be associated with 357 phase units. The phase units may be grouped into any suitable number of bins, for example, five to ten bins such as seven bins. An example phase histogram with 357 phase units grouped into seven bins is described with respect to TABLE 1.

TABLE 1

| Bin Identifier | Phase Unit Endpoints | | Center Phase | Frequency |
| --- | --- | --- | --- | --- |
| Bin | Minimum | Maximum | Unit | a(bin) |
| 0 | 0 | 50 | 25 | a(0) |
| 1 | 51 | 101 | 76 | a(1) |
| 2 | 102 | 152 | 127 | a(2) |
| 3 | 153 | 203 | 178 | a(3) |
| 4 | 204 | 254 | 229 | a(4) |
| 5 | 255 | 305 | 280 | a(5) |
| 6 | 306 | 356 | 331 | a(6) |

TABLE 1 includes fields for a bin identifier, phase unit endpoints, a center phase unit, and a frequency value for each bin entry. A bin identifier uniquely identifies a bin. In the example, the bin identifiers bin are 0, 1, . . . , 6. Since the phase variable is periodic, 0 and 357 phase units represent the same value.

Phase unit endpoints describe the maximum and minimum phase units for a bin, and a center phase unit describes the center phase unit of a bin. A frequency value indicates the relative incidence of the phase of a bin. To limit the frequency values, the sum of the frequency values may be set to equal a maximum sum. As an example, if the frequency values are probabilities, the maximum sum may be set to one. As another example, if the frequency values are integers, the maximum sum may be set to an integer value such as 256 or other suitable value. As newer frequency values are computed, the newer frequency values replace the older frequency values.

According to one embodiment, a most probable phase may be calculated from a weighted average of any suitable number of bins. A most probable phase may refer to the most frequent phase of a signal. The most probable phase may be calculated from one or more highest frequency bins. The one or more highest frequency bins may refer to the bin that has the highest frequency value and zero, one, two, or more bins either adjacent to or proximate to the bin that has the highest frequency value. For example, a most probable phase $\Phi_{mp}$ may be calculated using the bin that has the highest frequency value and the bins adjacent to the bin that has the highest frequency value according to Equation (2):

$$\Phi_{mp} = \frac{\sum_{bin_M-1}^{bin_M+1} \Phi(bin) \cdot a(bin)}{\sum_{bin_M-1}^{bin_M+1} a(bin)} \quad (2)$$

where $bin_M$ represents the bin that has the highest frequency value, and $\Phi(bin)$ represents the phase corresponding to bin. The phase corresponding to a bin may be the phase associated with the middle of the bin, that is, the phase associated with the center phase unit. The most probable phase, however, may be calculated in any suitable manner, for example, as the average of the resulting phases. Since bin 0 is adjacent to bin 6, a(bin)=a(bin+7) for bin<0 and a(bin)=a(bin−7) for bin>6.

Signal modifier 28 may select phase adjustments that tend towards the most probable phase. To select phase adjustments that tend towards the most probable phase, a phase distance between a phase and the most probable phase may be measured. A phase distance d may measure the difference between a first phase $\Phi_1$ and a second phase $\Phi_2$, and may be defined according to Equation (3a):

$$d(\Phi_1,\Phi_2)=|\Phi_1-\Phi_2| \quad (3a)$$

For a general diversity parameter $f_q$, the distance $d(f_1, f_2)$ may be defined according to Equation (3b):

$$d(f_1,f_2)=\|f_1-f_2\| \quad (3b)$$

According to one embodiment, the distance between two phases refers to the absolute distance between the phases as measured along a circle in, for example, degrees. For example, the difference between 10° and 30° is 20°, and the difference between 350° and 10° is 20°.

As an example, adjustments that move towards to the most probable phase may be favored over adjustments that move away from the most probable phase. An adjustment threshold value that triggers whether an adjustment is to be applied may be used to favor closer adjustments. A lower threshold may be set for adjustments that move towards the most probable phase, and a higher threshold may be set for adjustments that move away from the most probable phase.

As another example, adjustments that move towards the most probable phase may undergo larger changes than adjustments that move away from the most probable phase. A step parameter may be used to control the changes. A step parameter may refer to a parameter that may be used to control the magnitude of a phase adjustment. A smaller step parameter may be applied to adjustments that move away from the most probable phase, and a larger step parameter may be applied to adjustments that move closer to the most probable phase. In general, a smaller step parameter may be applied to a diversity parameter adjustment f(k+1) that move away from the most probable vector f(k), and a larger step parameter may be applied to a diversity parameter adjustment f(k+1) that move closer to the most probable vector f(k).

Although the embodiment is described as controlling phase, other and additional features may be controlled, for example, phase and amplitude may be controlled. According to one embodiment, phase and amplitude are controlled according to their distance from the most probable phase and amplitude values. The phase and amplitude values may be calculated for two or more signals. The most probable phase and amplitude values may be used to determine next phase and amplitude adjustments of each signal. In this case, the complex vectors refer to information describing phase and amplitude values from adjustments previously applied to the signal.

According to the embodiment, the phase-amplitude data may be expressed as a phase-amplitude histogram of the applied phase and amplitude values. The phase-amplitude histogram may indicate the frequency distribution of the applied phase and amplitude values over phase and amplitude variables. The bins may encompass a two-dimensional plane, which may be represented in a polar system with similar bins for the phase and amplitude bins. The bins may range from $A_{min}$ to $A_{max}$, where A represents amplitude on a logarithmic scale. As an example, in a two-signal case, a first signal may be set as the reference signal and a second signal defined relative to the first signal. The amplitude span may be 63 decibels in 9 bins of 7 decibels each. In this case, the 9 amplitude bins and 7 phase bins define a bi-dimensional phase-amplitude space of 63 bins.

Feedback communication device 20b includes a feedback generator 30 that generates feedback that reflects the quality of the modified signals. The feedback may include one or more quality indicators. According to one embodiment, a quality indicator may instruct modifying communication device 20a to increase or decrease transmission power. An up value instructs modifying communication device 20a to increase the total power of its transmitted signal, and a down value instructs modifying communication device 20a to decrease the total power. A quality indicator may comprise, for example, a power control bit of a code division multiple access (CDMA) power control signal. The quality indicators may be sent to modifying communication device 20a in a quality indication signal.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to communication network 10 without departing from the scope of the invention. Additionally, operations of communication network 10 may be performed using any suitable logic comprising software, hardware, other logic, or any suitable combination of the preceding. As used in this document, "each" refers to each member of a set or each member of a subset of a set. A subset of a set may include none, some, or all elements of the set.

Figure 2:
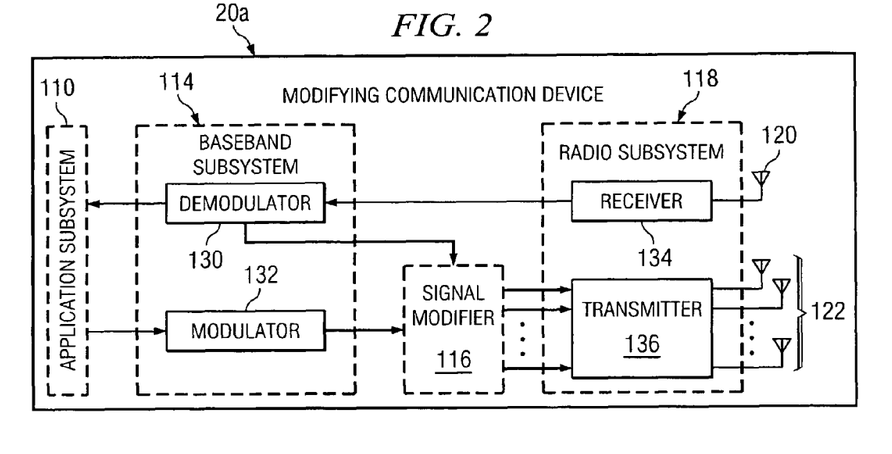
FIG. 2 is a block diagram illustrating one embodiment of a modifying communication device that may be used with the network of FIG. 1.

FIG. 2 is a block diagram illustrating one embodiment of a modifying communication device 20a that may be used with network 10 of FIG. 1. Modifying communication device 20a may comprise, for example, a subscriber unit. Modifying communication device 20a may include an application subsystem 110, a baseband subsystem 114, a signal modifier 116, a radio subsystem 118, a receive antenna 120, and one or more transmit antennas 122 coupled as shown. Baseband subsystem 114 includes a demodulator 130 and a modulator 132, and radio subsystem 118 includes a receiver 132 and a transmitter 136. According to one embodiment of operation, a receive signal passes through receive antenna 120, receiver 134, demodulator 130, and application subsystem 110. A transmit signal passes through application subsystem 110, modulator 132, signal modifier 116, transmitter 136, and transmit antennas 122.

Application subsystem 110 processes receive signals to extract information communicated in the receive signals, and processes transmit signals for transmission to communicate information. Baseband subsystem 114 performs baseband signal processing. Modulator 130 modulates signals, and demodulator 132 demodulates signals and extracts quality indicators from signals. According to one embodiment, baseband subsystem 114 generates a control signal that controls the transmission power of modifying communication device 20a. Any other suitable component of modifying communication device 20a, however, may generate the control signal. A control signal may instruct modifying communication device 20a to increase or decrease the transmission power in accordance with feedback from feedback communication device 20b.

Signal modifier 116 modulates one or more of signals to yield one or more modified signals, each of which may be transmitted by an element of transmit antennas 122. The signals may be modified to increase constructive interference or reduce destructive interference. A modification may refer to one or more adjustments of one or more modulation features of a signal. According to one embodiment, a modification may be described as the application of a diversity parameter.

Radio subsystem 118 performs radio frequency signal processing. Receiver 134 receives signals from receive antenna 120, and transmitter 136 sends signals to one or more transmit antennas 122. Receive antenna 120 receives signals and may have one or more antenna elements. Transmit antennas 122 transmit signals and may have one or more antenna elements, where each antenna element transmits a transmit signal.

Modifications, additions, or omissions may be made to modifying communication device 20a without departing from the scope of the invention. For example, communication device 20a may have more, fewer, or other modules. Moreover, the operations of communication device 20a may be performed by more, fewer, or other modules using any suitable logic.

Figure 3:
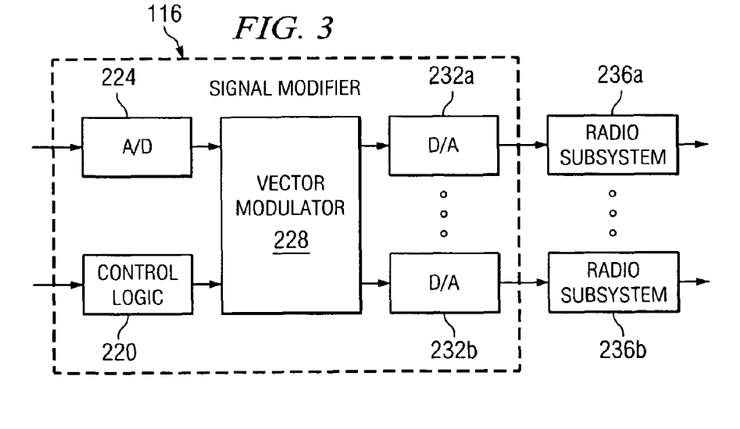
FIG. 3 is a block diagram illustrating one embodiment of a signal modifier that may be used with the modifying communication device FIG. 2.

FIG. 3 is a block diagram illustrating one embodiment of a signal modifier 116 that may be used with any suitable communication device 20 such as communication device 20a of FIG. 2. Signal modifier 116 includes control logic 220, an analog-to-digital (A/D) converter 224, a vector modulator 228, and one or more digital-to-analog (D/A) converters 228a and 228b coupled as shown. D/A converters 228a and 228b are coupled to one or more radio subsystems 236a and 236b as shown. A D/A converter 228a and a radio subsystem 236a may be associated with an antenna element.

According to the illustrated embodiment, signal modifier 116 receives a signal. A/D converter 224 converts the signal from an analog form to a digital form and forwards the signal to vector modulator 228. Control logic 220 establishes a phase adjustment. The phase adjustment may be determined in accordance with a control signal or with a quality indication signal from feedback communication device 20b. Control logic 220 provides to vector modulator 228 instructions for performing the modification according to the phase adjustment. According to one embodiment, control logic 220 provides complex weighting values to vector modulator 228. The complex weighting may be calculated by determining the appropriate weighting value associated with the in-phase signal component and the quadrature signal component for an antenna element.

Vector modulator 228 splits the signal into multiple signals, and applies the complex weighting to at least a subset of the signals to modify the subset of signals based on the complex weighting values. D/A converters 228a through 228b convert the signals to analog form. Radio subsystems 236a through 236b convert the signals to a radio frequency. The signals may be forwarded to power amplifiers and respective antenna elements.

Modifications, additions, or omissions may be made to signal modifier 116 without departing from the scope of the invention. For example, signal modifier 116 may have more, fewer, or other modules. Moreover, the operations of signal modifier 116 may be performed by more, fewer, or other modules using any suitable logic.

Figure 4:
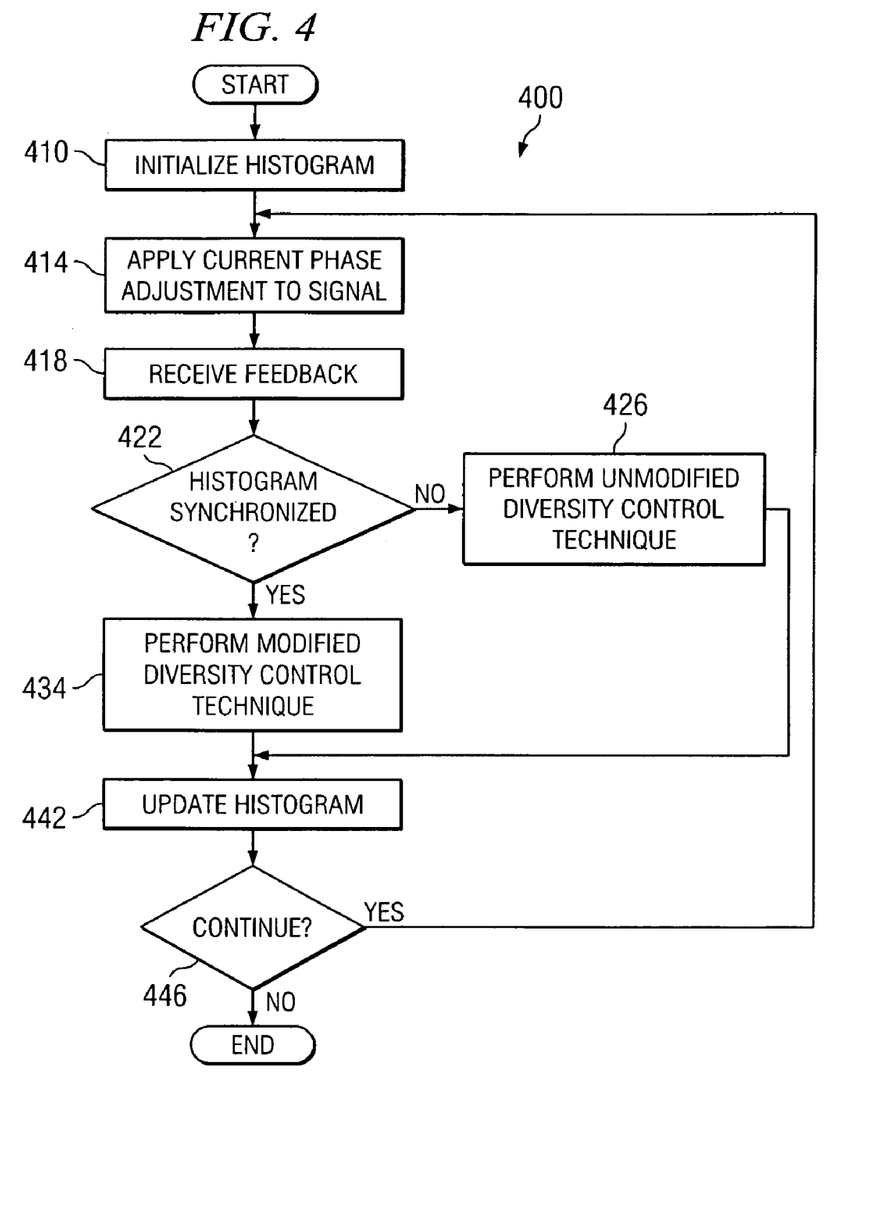
FIG. 4 is a flowchart illustrating one embodiment of a method for determining diversity parameter adjustments that may be used by the signal modifier of FIG. 3.

FIG. 4 is a flowchart 400 illustrating one embodiment of a method for determining diversity parameter adjustments, such as phase adjustments, that may be used by signal modifier 116 of FIG. 3 with a diversity parameter histogram, such as the phase histogram described by TABLE 1. The method begins at step 410, where the phase histogram is initialized. The phase histogram may be initialized in any suitable manner. As an example, the frequency values may be initialized. According to one embodiment, the values may be made as similar as possible, but not necessarily equal to each other. For example, the initials frequency values of the bins may be set according to Equation (4):

$$a(\text{bin})=1/7 \text{ for bin}=0, 1, 2, \quad (4)$$

As another example, parameter values may be initialized. According to one embodiment, the frequency values may be defined for the expanded bins to indicate that each expanded entry of the table is equivalent to the entry for the bin one period away, where the period is the number of bins representing 360 degrees. In this example, the period is 7, so the values may be defined according to Equation (5):

$$a(\text{bin})=a(\text{bin}\pm 7) \quad (5)$$

Accordingly:

$$a(-1)=a(6)$$

$$a(7)=a(0)$$

Signal modifier 28 applies a current phase adjustment to a signal at step 414. Modifying communication device 20a receives feedback from feedback communication device 20b at step 418. The feedback indicates the power of the signal as received by feedback communication device 20b.

Signal modifier 28 determines whether the histogram is synchronized at step 422. A synchronized histogram may refer to a phase histogram that is tracking the optimal phase. A histogram may be determined to be synchronized according to any suitable conditions. As an example, a histogram may be evaluated according to a confidence criterion. According to the confidence criterion, the sum of the frequency values of one or more adjacent bins is required to be greater than a confidence threshold. As another example, the histogram may be evaluated according to a direct association condition. According to the direct association condition, values of the histogram bins are compared. The difference between the largest histogram value and the higher among the values of the two bins adjacent to the bin of the largest histogram value is calculated. If the difference is greater than a direct association threshold, the present phase must fall inside the bin with the highest value. Otherwise, the present phase must fall either inside the bin with the highest value or inside the adjacent bin with the higher value.

A histogram may be designated as synchronized based on any suitable combination of the conditions. As an example, the histogram may be designated as synchronized if it satisfies one or both of the conditions. A histogram may be designated as not synchronized if it fails to satisfy any suitable combination of the conditions. As an example, a histogram may be designated as not synchronized if the confidence criterion is not met. As another example, a histogram may be designated as not synchronized if the direct association condition is not met. As yet another example, the histogram may be designated as not synchronized if the distance between the histogram most probable value and the last adjustment exceeds a certain threshold.

If the histogram is not synchronized, the method proceeds to step 426, where a standard version of a diversity control technique is performed. As an example, a standard window or perturbation technique may be performed. An example of a standard window technique is described with reference to FIG. 5.

According to a standard perturbation technique, two phases are defined: a higher-phase perturbation phase+delta, where phase represents the present phase estimate, and a lower-phase perturbation phase−delta. According to one embodiment, if the feedback indicators for the phases are equivalent, no action is taken. If one feedback indicator indicates a power increase and the other feedback indicator indicates a power decrease, then a step is made in the direction of the perturbation associated with the power decrease. According to one example, the step may be significantly smaller than delta. If the histogram is synchronized, the step away from the most probable phase may be smaller than the step towards the most probable phase.

According to another embodiment, if the feedback indicators for the phases are equivalent, then any suitable process may be performed. As an example, a smaller step may be made towards the most probable phase. As another example, the direction of the last step may be repeated with a smaller step away from the most probable phase and a larger step towards the most probable phase. The method then proceeds to step 442.

If the histogram is synchronized, the method proceeds to step 434, where a modified version of a diversity control technique is performed. As an example, a modified window or perturbation technique may be performed. Examples of modified window and perturbation techniques are described with reference to FIG. 6 and FIG. 8, respectively. The method then proceeds to step 442.

The phase histogram is updated at step 442. The histogram may be updated in any suitable manner. The histogram is updated with phase values calculated during steps 426, 434, or 438. If the method is to be continued at step 446, the method returns to step 414 where a current phase adjustment is applied to the signal. If the method is not to be continued at step 446, the method terminates.

Modifications, additions, or omissions may be made to the method without departing from the scope of the invention. The method may include more, fewer, or other steps. Additionally, steps may be performed in any suitable order without departing from the scope of the invention.

Figures 5, 6:
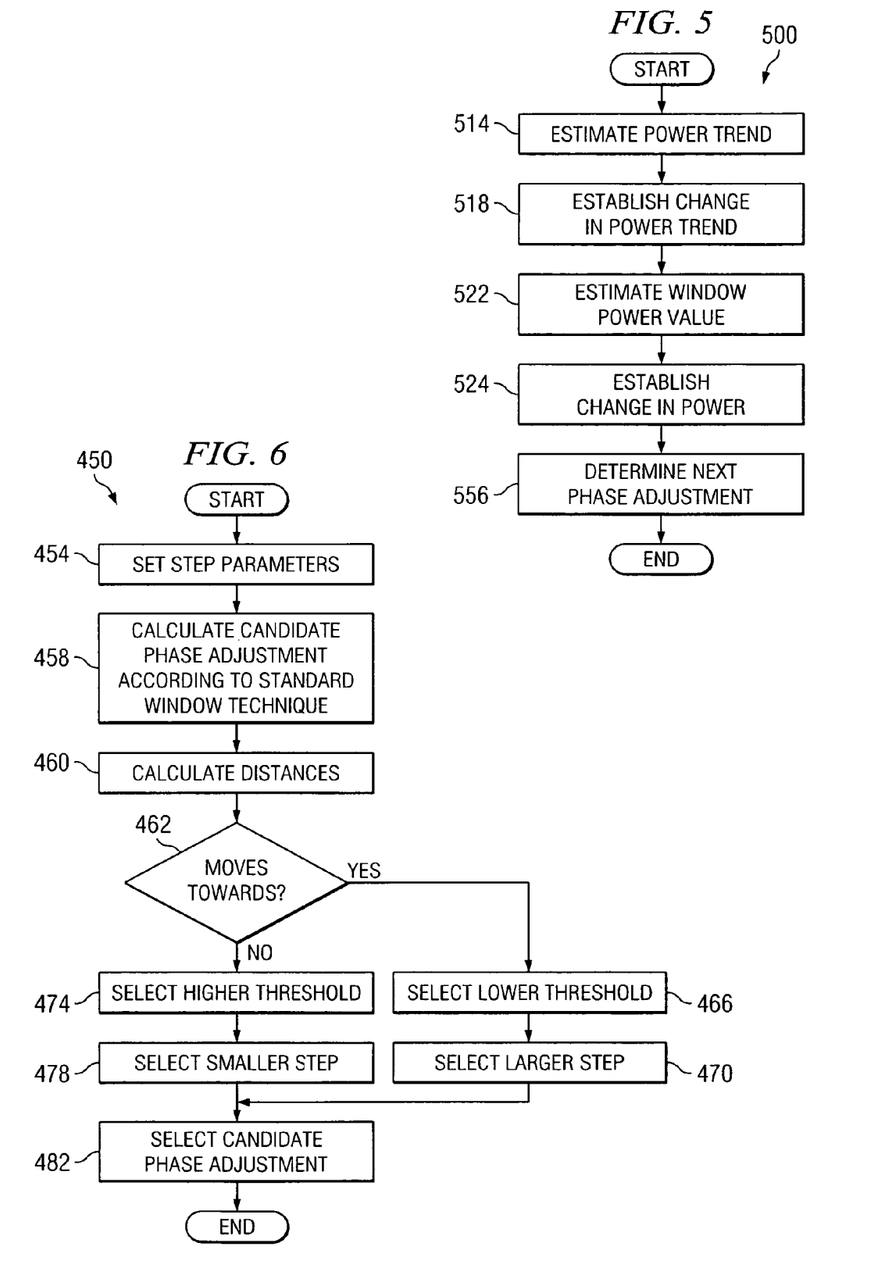
FIG. 5 is a flowchart illustrating one embodiment of a standard window technique for determining diversity parameter adjustments that may be used with the modified window technique of FIG. 4.
FIG. 6 is a flowchart illustrating one embodiment of a modified window technique for determining diversity parameter adjustments that may be used with the method of FIG. 4.

FIG. 5 is a flowchart 500 illustrating one embodiment of a standard window technique for determining diversity parameter adjustments, such as phase adjustments, that may be used with the modified window technique of FIG. 4. According to the window technique, signal modifier 116 receives feedback at step 454 of FIG. 4 from a control signal generated at modifying communication device 20a.

A power trend is estimated from the power indicators of the control signal at step 514. A power trend of a window may refer to the change of power within the window. According to one embodiment, the power trend may be calculated by taking the difference between the power value of an initial participating slot and the power value of a final participating slot as expressed by Equation (6):

$$\text{trend}(k) = PS(i_{fin}, k) - PS(i_{init}, k) \quad (6)$$

where $PS(i,k)$ denotes the power value of slot i of window k, $i_{init}$ represents the initial participating slot, and $i_{fin}$ represents the final participating slot.

The power trend change is established at step 518. A power trend change may refer to the difference between the trend of a preceding window and the trend of a current window. Power trend change $\Delta T(k)$ for window k may be calculated by subtracting preceding power trend trend(k−1) from current power trend trend(k) according to Equation (7):

$$\Delta T(k) = \text{trend}(k) - \text{trend}(k-1) \quad (7)$$

The window power value representing the power of a window is estimated at step 522. The power of a window may refer to the average of power values of participating slots of the window. Window power value power(k) of a window k may be calculated by summing the power values of the participating slots according to Equation (8):

$$\text{power}(k) = \sum_{i=i_{init}}^{i_{fin}} PS(i, k) \quad (8)$$

The change in power is established at step 524. A power change may refer to the difference between the power of a preceding window and the power of a current window. Power change $\Delta P(k)$ for window k may be calculated by subtracting preceding power power(k−1) from current power power(k) according to Equation (9):

$$\Delta P(k) = \text{power}(k) - \text{power}(k-1) \quad (9)$$

Power change $\Delta P(k)$ may be calculated from a power value $PS(i,k)$ representing a linear value or a logarithmic value.

A next phase adjustment is determined according to the phase increment at step 556. The next phase adjustment may be determined in any suitable manner. As an example, the magnitude of power trend change $\Delta T(k)$ and the magnitude of power change $\Delta P(k)$ may satisfy a condition. According to one embodiment, the condition may be given as:

$$\Delta T(k) > T_{thresh1}, \text{ OR}$$

$$T_{thresh1} < \Delta T(k) \leq T_{thresh2} \text{ AND } \Delta P(k) > P_{thresh1}, \text{ OR}$$

$$T_{thresh2} < \Delta T(k) \leq T_{thresh3} \text{ AND } \Delta P(k) > P_{thresh2}, \text{ OR}$$

$$\ldots, \text{ OR}$$

$$T_{threshn-1} < \Delta T(k) \leq T_{threshn} \text{ AND } \Delta P(k) > P_{threshn-1}.$$

where $T_{threshp}$ represents the trend change threshold for window p+1, and $P_{threshp}$ represents the power change threshold for window p+1. Thresholds may be selected according to a histogram phase estimated from the histogram data. A lower threshold may be set for adjustments that move closer to the histogram phase, and a higher threshold may be set for adjustments that move away from the histogram phase.

If the magnitude of power trend change $\Delta T(k)$ and the magnitude of power change $\Delta P(k)$ satisfy the condition, the phase increment is calculated according to the trend change independent of power information. The phase increment $\Delta \Phi(k)$ of window k may be calculated according to Equation (10):

$$\Delta \Phi(k) = -\text{sign}[\Delta t(k)] \cdot \text{sign}[\Phi(k) - \Phi(k-1)] \cdot \text{step}_1 \quad (10)$$

where sign(x) represents the sign (+1 or −1) of value x, and $\text{step}_1$ designates a step parameter.

A step parameter may refer to a parameter used to control a magnitude of a phase adjustment. As an example, a step parameter may be a configurable parameter. As another example, a step parameter may be selected from a table of parameters according to feedback conditions. As another example, a step parameter may be randomly selected from a table of parameters. As another example, a step parameter may be a randomized value established according to one or more configurable parameters.

If the magnitude of power trend change $\Delta T(k)$ and the magnitude of power change $\Delta P(k)$ do not satisfy the condition, the phase increment is calculated according to the power change. Phase increment $\Delta \Phi(k)$ of window k may be calculated according to Equation (11):

$$\Delta \Phi(k) = -\text{sign}[\Delta P(k)] \cdot \text{sign}[\Phi(k) - \Phi(k-1)] \cdot \text{step}_2 \quad (11)$$

where $\text{step}_2$ designates a configurable step parameter. According to one embodiment, $\text{step}_2$ may be substantially similar to that of $\text{step}_1$. Steps may be selected according to the histogram phase. According to one embodiment, a larger step may be selected if a phase adjustment moves towards the histogram phase, and a smaller step may be selected if the phase adjustment moves away from the histogram phase.

The next phase adjustment is determined according to the phase increment. According to one embodiment, a next phase adjustment $\Phi(k+1)$ may be calculated from current phase adjustments $\Phi(k)$ and phase increment $\Delta \Phi(k)$ according to Equation (1). After determining the next phase adjustment, the method terminates.

Modifications, additions, or omissions may be made to the technique without departing from the scope of the invention. The technique may include more, fewer, or other steps. Additionally, steps may be performed in any suitable order without departing from the scope of the invention.

FIG. 6 is a flowchart 450 illustrating one embodiment of a modified window technique for determining diversity parameter adjustments, such as phase adjustments, that may be used with the method of FIG. 4. According to the window technique, signal modifier 116 receives feedback at step 454 of FIG. 4 from a control signal generated at modifying communication device 20a. Step parameters are set at step 454. A candidate phase adjustment is calculated according to a standard window technique at step 458. An example of a standard window technique is described with reference to FIG. 5. A candidate phase adjustment may refer to a phase adjustment that may be selected, depending upon whether certain conditions are satisfied. A candidate phase adjustment applied to a signal yield a candidate phase.

One or more distances between phases are calculated at step 460. Any suitable distance may be calculated to determine the next phase adjustment. As an example, a candidate distance measuring the distance between the candidate phase and the histogram phase may be calculated. The one or more distances are evaluated at step 462 to determine whether the candidate phase adjustment moves towards the histogram phase.

If the candidate phase adjustment moves towards the histogram phase, the method proceeds to step 466, where a lower threshold is applied to the candidate phase adjustment. A larger step is applied to the candidate phase adjustment at step 470. If the candidate phase adjustment moves away from the histogram phase, the method proceeds to step 474, where a higher threshold is applied to the candidate phase adjustment. A smaller step is applied to the candidate phase adjustment at step 478. The candidate phase adjustment is selected as the next phase adjustment at step 182. After selecting the candidate phase adjustment as the next phase, the method terminates.

Modifications, additions, or omissions may be made to the technique without departing from the scope of the invention. The technique may include more, fewer, or other steps. Additionally, steps may be performed in any suitable order without departing from the scope of the invention.

As an example, steps 458 through 478 may be performed as follows. The candidate phase adjustment may be calculated with set one of thresholds and steps. The candidate phase adjustment may be evaluated according to the following condition:

$$d(f_{cand}(k+1), f(k)) > \text{HistWin\_threshold}$$

where $f_{cand}$ represents the candidate phase adjustment. If the condition is satisfied, the candidate phase adjustment is accepted. If the condition is not satisfied, the candidate phase adjustment is recalculated with set two of thresholds and steps.

Figure 7:
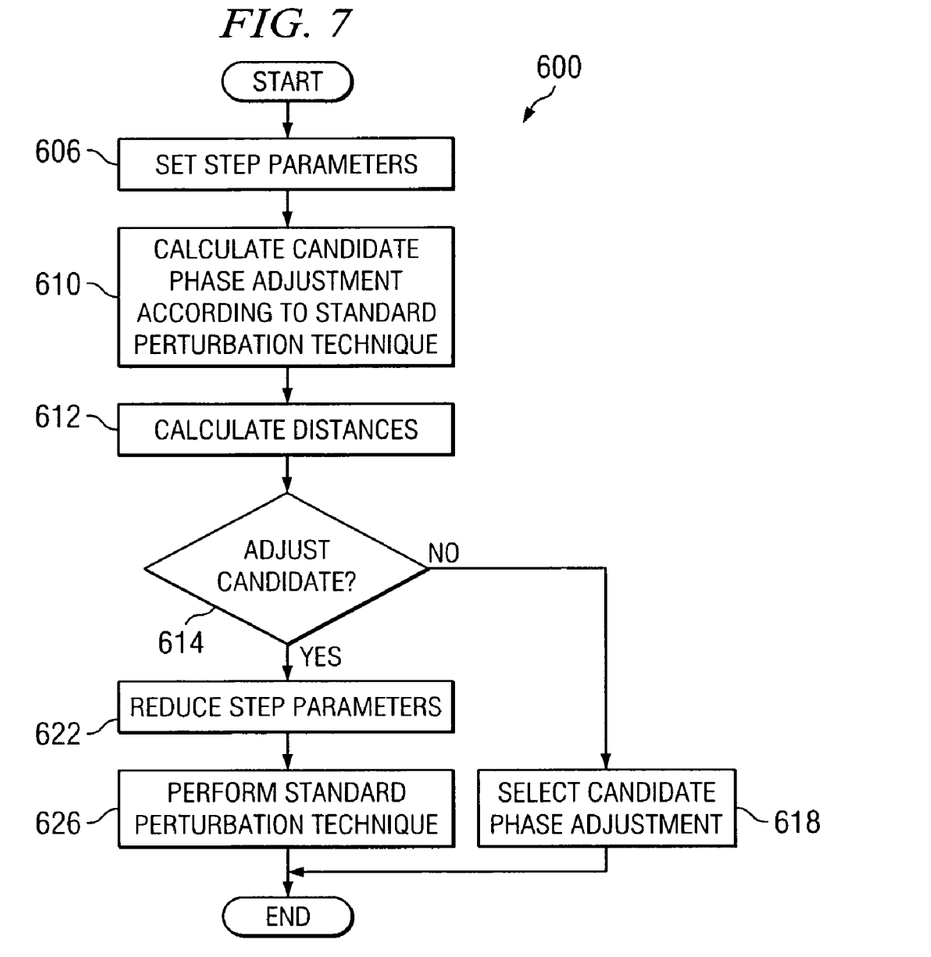
FIG. 7 is a flowchart illustrating one embodiment of a modified perturbation technique for determining diversity parameter adjustments that may be used with the method of FIG. 4.

FIG. 7 is a flowchart 600 illustrating one embodiment of a modified perturbation technique for determining diversity parameter adjustments, such as phase adjustments, that may be used with the method of FIG. 4. According to the modified perturbation technique, modifying communication device 20a receives feedback comprising a quality indication signal from feedback communication device 20b at step 418 of the method of FIG. 4.

Step parameters are set at step 606. A candidate phase adjustment is calculated according to a standard perturbation technique at step 610. One or more distances are calculated at step 612. Any suitable distance may be calculated to determine the next phase adjustment. As an example, a candidate distance measuring the distance between the candidate phase and the most probable phase may be calculated. As another example, a most recent distance measuring the distance between the most recently applied phase and the most probable phase may be calculated.

The one or more distances are evaluated at step 614 to determine whether the candidate phase adjustment should be adjusted. The distances may evaluated in any suitable manner. As a first example, the candidate distance may be compared to the most recent distance. As a second example, the most recent distance may be compared to a distance threshold that is used to determine whether to adjust the candidate phase adjustment. If the candidate distance is less than the most recent distance or if the most recent distance satisfies the distance threshold, the candidate phase adjustment may be maintained. If the candidate distance is greater than the most recent distance and if the most recent distance fails to satisfy the distance threshold, the candidate phase adjustment may be adjusted.

If the candidate phase adjustment is not to be adjusted, the method proceeds to step 618. The candidate phase adjustment is selected as the next phase adjustment at step 618. After selecting the candidate phase adjustment as the next phase, the method terminates.

If the candidate phase adjustment is to be adjusted, the method proceeds to step 622. The step parameters are reduced at step 622. Reduced step parameters may yield a smaller next phase adjustment. The standard perturbation technique is performed at step 626. After performing the standard perturbation technique, the method terminates.

Modifications, additions, or omissions may be made to the technique without departing from the scope of the invention. The technique may include more, fewer, or other steps. Additionally, steps may be performed in any suitable order without departing from the scope of the invention.

Certain embodiments of the invention may provide one or more technical advantages. A technical advantage of one embodiment may be that a next phase adjustment to apply to a signal is determined according to phase data describing phases from adjustments previously applied to the signal. Determining the next phase adjustment according to the phase data may increase the probability of selecting a more optimal phase adjustment. A technical advantage of another embodiment may be that a most probable phase is calculated from the phase data. Phase adjustments that tend towards the most probable phase may be selected at the next adjustment. Selecting phase adjustments that tend towards the most probable phase may increase the probability of selecting more optimal phase adjustments.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for calculating a diversity parameter adjustment, comprising:

accessing prior diversity parameter data, the prior diversity parameter data generated from a plurality of diversity parameter adjustments previously applied to a signal transmitted from a modifying communication device to a feedback communication device; and repeating the following for a plurality of iterations:
modifying the signal according to a current diversity parameter adjustment;
receiving feedback describing the signal modified according to the current diversity parameter adjustment, the feedback describing the modified signal as received by the feedback communication device;
establishing a candidate diversity parameter adjustment based on said feedback;
estimating a most frequently applied diversity parameter value based on the prior diversity parameter data;
comparing the change from said current diversity parameter adjustment to said candidate diversity parameter with the change from said current diversity parameter adjustment to said most frequently applied diversity parameter; and
calculating a next diversity parameter adjustment in accordance with the comparison.

2. The method of claim 1, wherein calculating the next diversity parameter adjustment in accordance with the comparison further comprises:
calculating the next diversity parameter adjustment according to a larger step parameter if the change from the current diversity parameter adjustment to the candidate diversity parameter adjustment is in the same direction as the change from the current diversity parameter adjustment to the most frequently applied diversity parameter value; and calculating the next diversity parameter adjustment according to a smaller step parameter if the change from the current diversity parameter adjustment to the candidate diversity parameter adjustment is in the opposite direction as the change from the current diversity parameter adjustment to the most frequently applied diversity parameter value.

3. The method of claim 1, wherein calculating the next diversity parameter adjustment in accordance with the comparison further comprises:

calculating the next diversity parameter adjustment according to a lower threshold parameter if the change from the current diversity parameter adjustment to the candidate diversity parameter adjustment is in the same direction as the change from the current diversity parameter adjustment to the most frequently applied diversity parameter value; and calculating the next diversity parameter adjustment according to a higher threshold parameter if the change from the current diversity parameter adjustment to the candidate diversity parameter adjustment is in the opposite direction as the change from the current diversity parameter adjustment to the most frequently applied diversity parameter value.

4. The method of claim 1, wherein repeating the following for a plurality of iterations further comprises establishing whether the diversity parameter data is synchronized by:

establishing a frequency value for each diversity parameter adjustment range of a plurality of diversity parameter adjustment ranges;

identifying one or more highest frequency ranges, the one or more highest frequency ranges comprising a diversity parameter adjustment range having the highest frequency value; and determining whether the one or more frequency values of the one or more highest frequency ranges satisfies a frequency threshold.

5. The method of claim 1, wherein repeating the following for a plurality of iterations further comprises establishing whether the diversity parameter data is synchronized by:

establishing a frequency value for each diversity parameter adjustment range of a plurality of diversity parameter adjustment ranges;

identifying one or more highest frequency ranges, the one or more highest frequency ranges comprising a diversity parameter adjustment range having the highest frequency value; and determining whether the current diversity parameter adjustment falls within the one or more highest frequency ranges.

6. A system for calculating a diversity parameter adjustment, comprising:

memory operable to store prior diversity parameter data, the prior diversity parameter data generated from a plurality of diversity parameter adjustments previously applied to a signal transmitted from a modifying communication device to a feedback communication device; and control logic coupled to the memory, the control logic operable to repeat the following for a plurality of iterations:

modify the signal according to a current diversity parameter adjustment;

receive feedback describing the signal modified according to the current diversity parameter adjustment, the feedback describing the modified signal as received by the feedback communication device;

establish a candidate diversity parameter adjustment based on said feedback;

estimate a most frequently applied diversity parameter value based on the prior diversity parameter data;

compare the change from said current diversity parameter adjustment to said candidate diversity parameter with the change from said current diversity parameter adjustment to said most frequently applied diversity parameter; and calculate a next diversity parameter adjustment in accordance with the comparison.

7. The system of claim 6, wherein the control logic is operable to calculate the next diversity parameter adjustment in accordance with the comparison by:

calculating the next diversity parameter adjustment according to a larger step parameter if the change from the current diversity parameter adjustment to the candidate diversity parameter adjustment is in the same direction as the change from the current diversity parameter adjustment to the most frequently applied diversity parameter value; and calculating the next diversity parameter adjustment according to a smaller step parameter if the change from the current diversity parameter adjustment to the candidate diversity parameter adjustment is in the opposite direction as the change from the current diversity parameter adjustment to the most frequently applied diversity parameter value.

8. The system of claim 6, wherein the control logic is operable to calculate the next diversity parameter adjustment in accordance with the comparison by:

calculating the next diversity parameter adjustment according to a lower threshold parameter if the change from the current diversity parameter adjustment to the candidate diversity parameter adjustment is in the same direction as the change from the current diversity parameter adjustment to the most frequently applied diversity parameter value; and calculating the next diversity parameter adjustment according to a higher threshold parameter if the change from the current diversity parameter adjustment to the candidate diversity parameter adjustment is in the opposite direction as the change from the current diversity parameter adjustment to the most frequently applied diversity parameter value.

9. The system of claim 6, wherein the control logic is operable to repeat the following for a plurality of iterations by establishing whether the diversity parameter data is synchronized by:

establishing a frequency value for each diversity parameter adjustment range of a plurality of diversity parameter adjustment ranges;

identifying one or more highest frequency ranges, the one or more highest frequency ranges comprising a diversity parameter adjustment range having the highest frequency value; and determining whether the one or more frequency values of the one or more highest frequency ranges satisfies a frequency threshold.

10. The system of claim 6, wherein the control logic is operable to repeat the following for a plurality of iterations by establishing whether the diversity parameter data is synchronized by:
- establishing a frequency value for each diversity parameter adjustment range of a plurality of diversity parameter adjustment ranges;
- identifying one or more highest frequency ranges, the one or more highest frequency ranges comprising a diversity parameter adjustment range having the highest frequency value; and
- determining whether the current diversity parameter adjustment falls within the one or more highest frequency ranges.

11. A computer-readable medium having encoded therein logic for calculating a diversity parameter adjustment, the logic comprising hardware and operable to:
- access prior diversity parameter data, the prior diversity parameter data generated from a plurality of diversity parameter adjustments previously applied to a signal transmitted from a modifying communication device to a feedback communication device; and
- repeat the following for a plurality of iterations:
  - modify the signal according to a current diversity parameter adjustment;
  - receive feedback describing the signal modified according to the current diversity parameter adjustment, the feedback describing the modified signal as received by the feedback communication device;
  - establish a candidate diversity parameter adjustment based on said feedback;
  - estimate a most frequently applied diversity parameter value based on the prior diversity parameter data;
  - compare the change from said current diversity parameter adjustment to said candidate diversity parameter with the change from said current diversity parameter adjustment to said most frequently applied diversity parameter; and
  - calculate a next diversity parameter adjustment in accordance with the comparison.

12. The computer-readable medium of claim 11, wherein said logic is further operable to calculate the next diversity parameter adjustment in accordance with the comparison by:
- calculating the next diversity parameter adjustment according to a larger step parameter if the change from the current diversity parameter adjustment to the candidate diversity parameter adjustment is in the same direction as the change from the current diversity parameter adjustment to the most frequently applied diversity parameter value; and
- calculating the next diversity parameter adjustment according to a smaller step parameter if the change from the current diversity parameter adjustment to the candidate diversity parameter adjustment is in the opposite direction as the change from the current diversity parameter adjustment to the most frequently applied diversity parameter value.

13. The computer-readable medium of claim 11, wherein said logic is further operable to calculate the next diversity parameter adjustment in accordance with the comparison by:
- calculating the next diversity parameter adjustment according to a lower threshold parameter if the change from the current diversity parameter adjustment to the candidate diversity parameter adjustment is in the same direction as the change from the current diversity parameter adjustment to the most frequently applied diversity parameter value; and
- calculating the next diversity parameter adjustment according to a higher threshold parameter if the change from the current diversity parameter adjustment to the candidate diversity parameter adjustment is in the opposite direction as the change from the current diversity parameter adjustment to the most frequently applied diversity parameter value.

14. The computer-readable medium of claim 11, wherein said logic is further operable to repeat the following for a plurality of iterations by establishing whether the diversity parameter data is synchronized by:
- establishing a frequency value for each diversity parameter adjustment range of a plurality of diversity parameter adjustment ranges;
- identifying one or more highest frequency ranges, the one or more highest frequency ranges comprising a diversity parameter adjustment range having the highest frequency value; and
- determining whether the one or more frequency values of the one or more highest frequency ranges satisfies a frequency threshold.

15. The computer-readable medium of claim 11, wherein said logic is further operable to repeat the following for a plurality of iterations by establishing whether the diversity parameter data is synchronized by:
- establishing a frequency value for each diversity parameter adjustment range of a plurality of diversity parameter adjustment ranges;
- identifying one or more highest frequency ranges, the one or more highest frequency ranges comprising a diversity parameter adjustment range having the highest frequency value; and
- determining whether the current diversity parameter adjustment falls within the one or more highest frequency ranges.

16. The computer-readable medium of claim 11, wherein said logic is further operable to establish the candidate diversity parameter adjustment in accordance with feedback by:
- receiving a control signal generated by the modifying communication device in response to the feedback, the control signal operable to adjust the power of the signal at the modifying communication device; and
- calculating the candidate diversity parameter adjustment according to the control signal.

17. The computer-readable medium of claim 11, wherein said logic is further operable to establish the candidate diversity parameter adjustment in accordance with feedback by:
- receiving a quality indication signal comprising the feedback, the quality indication signal generated by the feedback communication device; and
- calculating the candidate diversity parameter adjustment according to the quality indication signal.

18. A system for calculating a diversity parameter adjustment, comprising:
- means for accessing prior diversity parameter data, the prior diversity parameter data generated from a plurality of diversity parameter adjustments previously applied to a signal transmitted from a modifying communication device to a feedback communication device;
- means for repeating the following for a plurality of iterations:
  - modifying the signal according to a current diversity parameter adjustment;
  - receiving feedback describing the signal modified according to the current diversity parameter adjustment, the feedback describing the modified signal as received by the feedback communication device;

establishing a candidate diversity parameter adjustment based on said feedback;
estimating a most frequently applied diversity parameter value based on the prior diversity parameter data;
comparing the change from said current diversity parameter adjustment to said candidate diversity parameter with the change from said current diversity parameter adjustment to said most frequently applied diversity parameter; and
calculating a next diversity parameter adjustment in accordance with the comparison.

19. A method for calculating a diversity parameter adjustment, comprising:
accessing diversity parameter data, the diversity parameter data generated from a plurality of diversity parameter adjustments applied to a signal transmitted from a modifying communication device to a feedback communication device;
repeating the following for a plurality of iterations:
modifying the signal according to one or more current diversity parameter adjustments;
receiving feedback describing the signal modified according to the current diversity parameter adjustments, the feedback describing the modified signal as received by the feedback communication device;
establishing a candidate diversity parameter adjustment based on said feedback by:
receiving a quality indication signal comprising the feedback, the quality indication signal generated by the feedback communication device;
receiving a control signal generated by the modifying communication device in response to the feedback if the quality indication signal is not available, the control signal operable to adjust the power of the signal at the modifying communication device;
calculating the candidate diversity parameter adjustment according to the control signal;
establishing whether the diversity parameter data is synchronized by:
establishing a frequency value for each diversity parameter adjustment range of a plurality of diversity parameter adjustment ranges;
identifying one or more highest frequency ranges, the one or more highest frequency ranges comprising a diversity parameter adjustment range having the highest frequency value; and
determining whether:
the one or more frequency values of the one or more highest frequency ranges satisfies a frequency threshold; and
the current diversity parameter adjustments or a recent diversity parameter adjustment fall within the one or more highest frequency ranges;
estimating a most frequently applied diversity parameter value based on the prior diversity parameter data;
comparing the change from said current diversity parameter adjustment to said candidate diversity parameter with the change from said current diversity parameter adjustment to said most frequently applied diversity parameter; and
calculating a next diversity parameter adjustment in accordance with the comparison by applying at least one of the following:
calculating the next diversity parameter adjustment according to a larger step parameter if the change from the current diversity parameter adjustment to the candidate diversity parameter adjustment is in the same direction as the change from the current diversity parameter adjustment to the most frequently applied diversity parameter value;
calculating the next diversity parameter adjustment according to a smaller step parameter if the change from the current diversity parameter adjustment to the candidate diversity parameter adjustment is in the opposite direction as the change from the current diversity parameter adjustment to the most frequently applied diversity parameter value;
calculating the next diversity parameter adjustment according to a lower threshold parameter if the change from the current diversity parameter adjustment to the candidate diversity parameter adjustment is in the same direction as the change from the current diversity parameter adjustment to the most frequently applied diversity parameter value; and
calculating the next diversity parameter adjustment according to a higher threshold parameter if the change from the current diversity parameter adjustment to the candidate diversity parameter adjustment is in the opposite direction as the change from the current diversity parameter adjustment to the most frequently applied diversity parameter value.

* * * * *